March 29, 1955  G. L. HELLER  2,705,190
APPARATUS FOR CARBON BLACK MANUFACTURE
Filed July 31, 1951  3 Sheets-Sheet 1
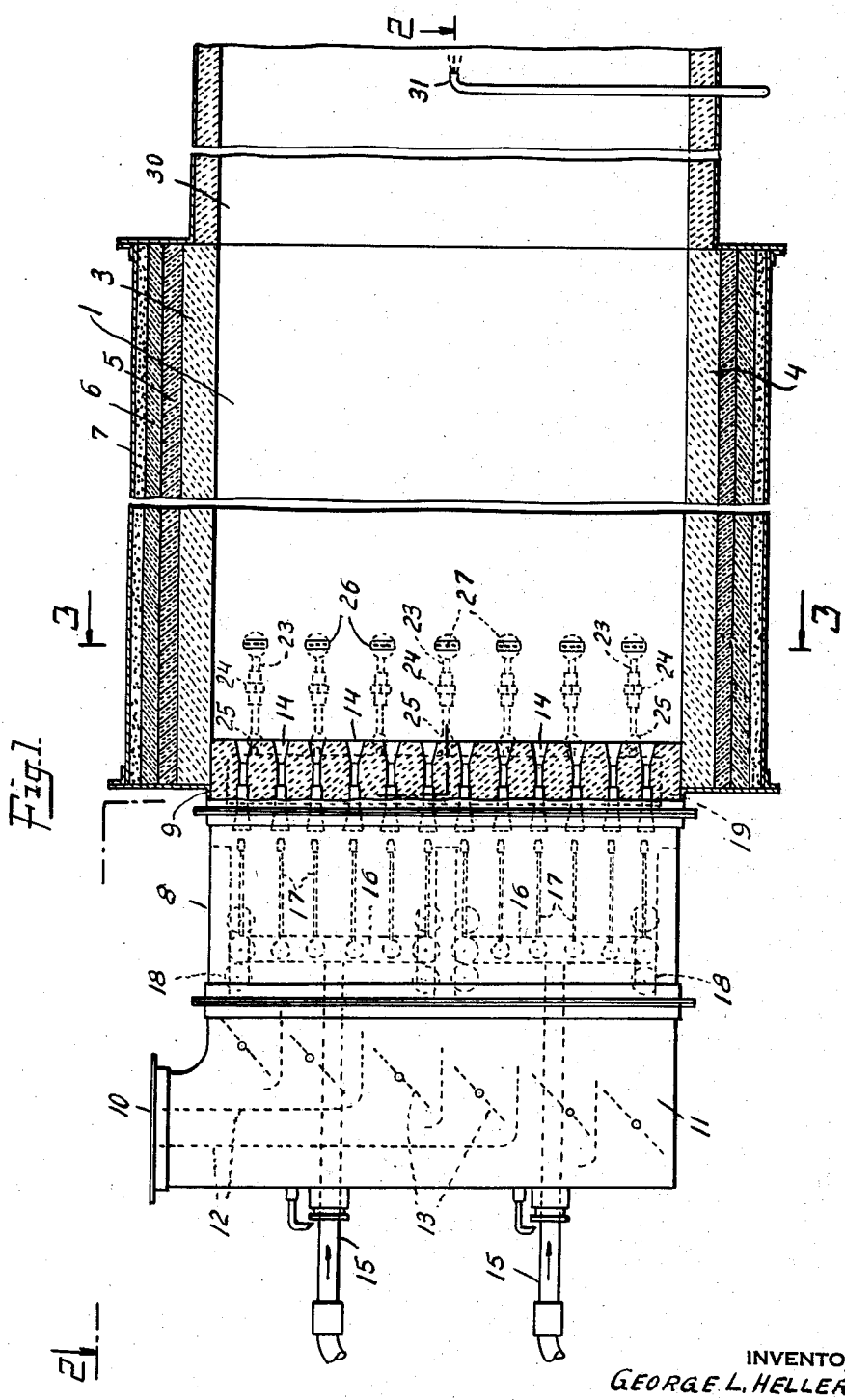
INVENTOR
GEORGE L. HELLER
BY
Pennie, Edmonds, Morton, Barrows & Taylor
ATTORNEYS March 29, 1955  G. L. HELLER  2,705,190
APPARATUS FOR CARBON BLACK MANUFACTURE
Filed July 31, 1951  3 Sheets-Sheet 2
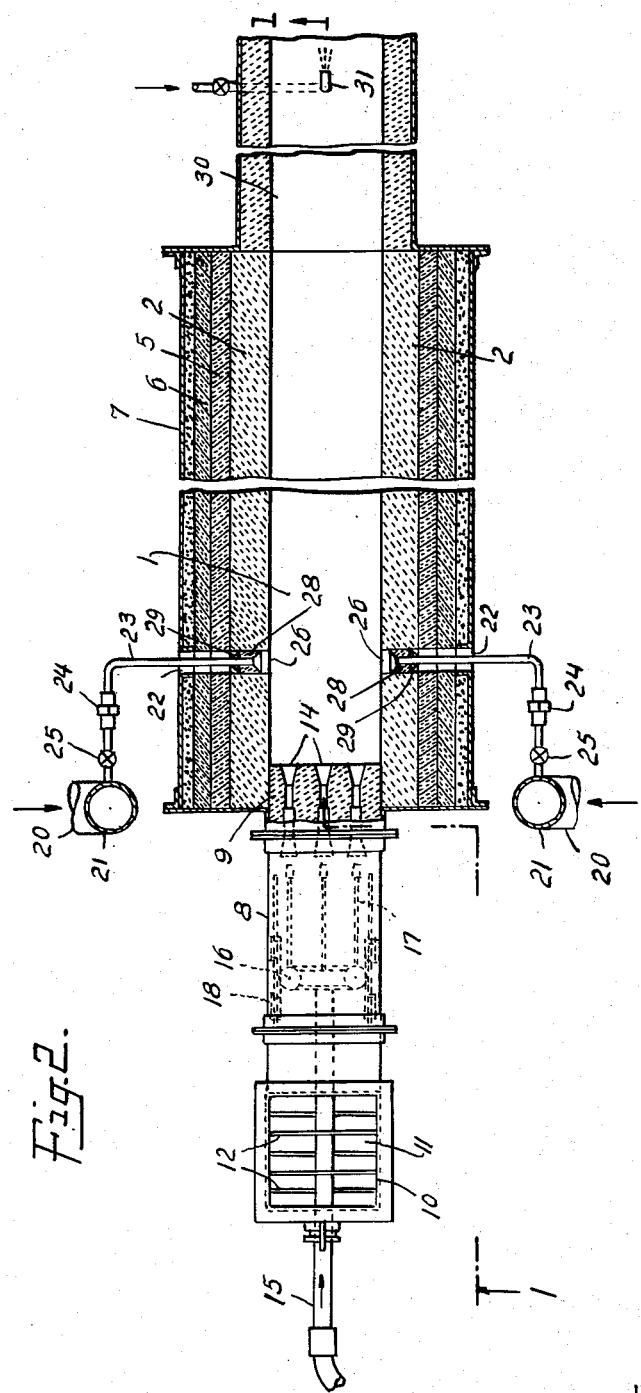
INVENTOR
GEORGE L. HELLER
BY
Pennie, Edmonds, Morton, Barrows & Taylor
ATTORNEYS March 29, 1955 G. L. HELLER 2,705,190
APPARATUS FOR CARBON BLACK MANUFACTURE
Filed July 31, 1951 3 Sheets-Sheet 3
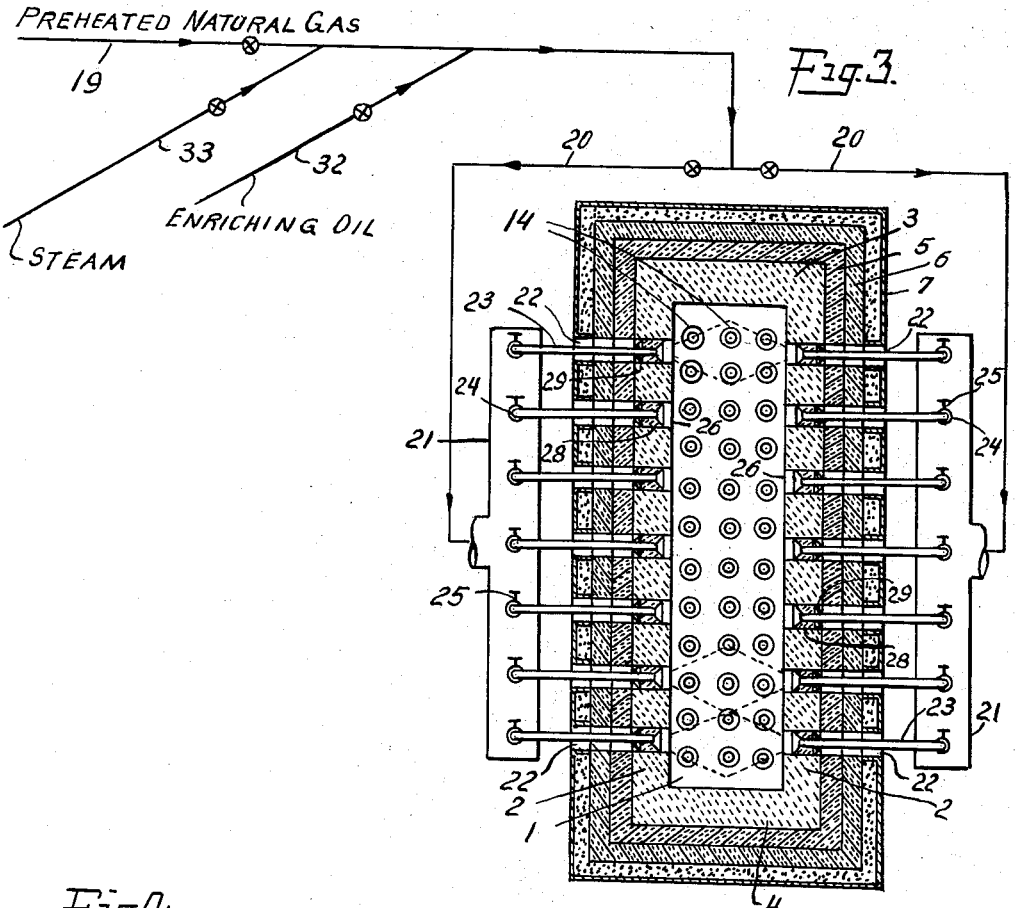
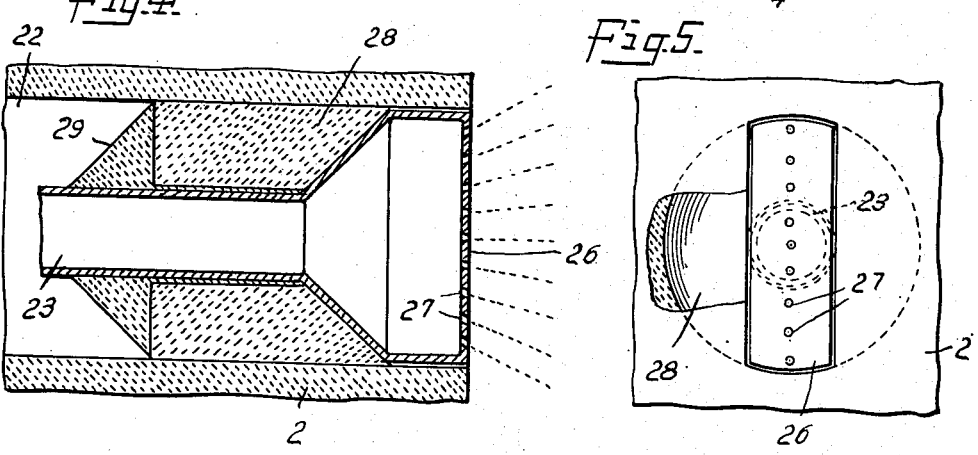
INVENTOR
GEORGE L. HELLER
BY
ATTORNEYS

United States Patent Office 2,705,190
Patented Mar. 29, 1955

2,705,190

APPARATUS FOR CARBON BLACK MANUFACTURE

George L. Heller, Monroe, La., assignor to Columbian Carbon Company, New York, N. Y., a corporation of Delaware Application July 31, 1951, Serial No. 239,510

6 Claims. (Cl. 23—259.5)

The present invention relates to the manufacture of furnace blacks by a process of the type in which a hydrocarbon is thermally decomposed by rapidly and uniformly mixing it with a hot, gaseous medium at a temperature in excess of that at which the hydrocarbon is decomposed to carbon black. The invention provides improved apparatus especially adapted to use in such operations.

In an advantageous operation of this type, the hydrocarbon to be decomposed is separately injected into a turbulent stream of hot blast flame gases flowing at high linear velocity through an elongated, heat insulated, chamber and are decomposed by heat absorbed from the hot gases to form the carbon black in suspension. The resultant gaseous suspension is withdrawn from the downstream end of the furnace chamber and is cooled and the carbon black separated therefrom.

It is particularly desirable in operations of this type that the mixing of the gaseous hydrocarbon to be decomposed, herein referred to as make, with the hot blast flame gases be exceedingly rapid and uniform. To promote such mixing, it has heretofore been proposed to carry out the reaction in a furnace chamber of rectangular cross-section not exceeding 18 inches in width, and to inject the make through the side walls of the chamber in a direction substantially at right angles to the direction of flow of the blast flame gases through the chamber. In order further to expedite uniform mixing, the hydrocarbon make has been thus injected as a plurality of small streams uniformly spaced over the entire height of the furnace chamber, the streams being separately injected through small open-ended tubes of about ¼ to ½ inch I. D., extending through the opposite side walls of the chamber and spaced at about 2 to 3 inches between centers.

Due to the relatively large heat conducting surfaces of these tubes in contact with the furnace wall, compared to the volume and rate of flow of the hydrocarbon make, the hydrocarbon passing therethrough is, at times, highly heated by heat absorbed from the furnace walls, and care must be exercised, especially when the make includes higher molecular weight, readily decomposed hydrocarbons, to avoid excessive overheating and decomposition of the make while passing through the injection tubes, which would result in the deposition of carbon therein. Further, it is generally necessary to clean these tubes frequently, so as to insure that the amount of hydrocarbon passing through the respective tubes will, at all times, be uniform.

Also, the use of such large numbers of small tubes has presented troublesome mechanical difficulties. The manifolding of these make injection tubes and access thereto for purposes of cleaning have been particularly troublesome. To insure uniform operation, these tubes must be periodically cleaned, as previously indicated, and this is tedious not only because of the number of tubes, but because of the relatively small distance between the individual tubes.

For the production of very fine grades of furnace carbons, or to obtain optimum ratios of the mass velocity of the entering streams of hydrocarbon make to that of the blast flame gases, it is frequently desirable that the entering streams of hydrocarbon make be of still smaller cross-section, so as to obtain complete dispersion even more rapidly. However, manifolding and cleaning difficulties and the tendency for the small stream of hydrocarbon make to become overheated in passing through the furnace walls become intolerable as the diameter of the injection tubes is further decreased.

My present invention provides improved apparatus whereby the difficulties previously experienced are materially reduced without interfering with the rapid, uniform mixing of the hydrocarbon make with the hot combustion gases within the furnace chamber and whereby the entering stream of hydrocarbon make may be still further reduced in diameter without multiplying those difficulties.

In accordance with my present invention, I may use, in place of the multiplicity of small injection tubes, a considerably reduced number of tubes connected to common manifolds and spaced a substantially greater distance apart. Those tubes extend for the greater part of the distance through the chamber wall, through ports in furnace wall of substantially larger diameter than that of the tubes. They are, likewise, uniformly spaced over the entire height of the furnace wall, but, because of their novel construction and arrangement, a substantially smaller number of such tubes is required and thereby manifolding and cleaning difficulties greatly reduced.

As an alternative the size, number and spacing between the tubes may be in accordance with present practice, as previously noted herein, and yet the transverse area of the respective streams of hydrocarbon make injected into the furnace chamber may be greatly reduced.

As these tubes approach the inner wall of the furnace chamber, their vertical dimension is materially increased, advantageously to the full height of the port through which it extends and the inner end of this enlargement, which is with advantage positioned substantially flush with the inner walls of the furnace chamber, is closed by a perforated end plate, or spray head, the perforations being uniformly spaced, vertically over the height of the plate. These openings through the spray heads are advantageously so directed as to cause the hydrocarbon make to enter the chamber as a fan-shaped spray, the spacing between the respective spray heads and the spread of the sprays being so coordinated that the edges of the adjacent fan-shaped sprays just meet to form a substantially uniform spray of hydrocarbon over the entire height of the chamber. However, it is not essential that arrangement of the spray heads and the openings through the spray heads be adapted to form the type of spray as just described. These openings may, for instance, extend substantially perpendicular to the inner chamber wall.

Since these tubes are not in direct contact with the furnace wall over the greater portion of their length, the hydrocarbon passing therethrough is heated to a much lesser extent and enters the spray head at a temperature such that little or no deposition of carbon is formed in either the tubes or the spray heads. Also, since each tube supplies the make for a number of streams, the velocity of the hydrocarbon passing through the more strongly heated portion of the tube is independent of the mass velocity of the make streams entering the chamber, as it may be varied by changing the number of and size of the openings through the end plate.

The respective tubes are, with advantage, centered in the port by means of a plug of refractory, heat-insulating material having an outer dimension substantially coinciding with the inner dimension of the port and having a hole extending centrally therethrough substantially the size of the outer diameter of the tube. This plug serves to center the tube in the port and maintain the face of the spray head in line with the plane of the furnace wall, and further aids in sealing the port against egress of furnace gases. The invention will be further described and illustrated by reference to the accompanying drawings, which represent, conventionally and somewhat diagrammatically, the presently preferred embodiment of my invention, and of which Figure 1 is a somewhat fragmentary, longitudinal, sectional view in elevation of the furnace chamber with auxiliary equipment, including the blast burner;

Figure 2 is a longitudinal sectional plan view of the apparatus of Figure 1;

Figure 3 is a transverse sectional view along the lines 3—3 of Figure 1;

Figure 4 is an enlarged longitudinal sectional view of the presently preferred type of spray head, and Figure 5 is an end view of Figure 4.

In the drawings, the furnace chamber 1 is of rectangular cross-section and is delineated by substantially vertical side walls 2, roof wall 3 and floor 5 of furnace refractory, these walls being covered by layers of heat-insulating material 5 and 6, all encased in a sheet metal shell 7. Positioned in the forward end of the chamber is the blast burner head 8, the burner block 9 of the burner head being coextensive with the transverse area of the chamber and of such dimension as to slide into the forward end of the chamber 1, into which it is sealed by conventional means.

In operations, air for combustion is supplied to the blast burner by forcing it under pressure, by any suitable means, through the air inlet 10 into the wind box 11 of the blast burner 8. The wind box is provided with distributing vanes 12 and dampers 13 for effecting uniform distribution of the air among the respective burner ports 14 uniformly spaced over the entire face of the burner block. Hydrocarbon fuel is supplied to the burner through fuel lines 15 leading to fuel manifolds 16 and, from thence, is jetted into the respective burner ports through the spuds 17. In the burner shown, the manifolds are adjustably supported within the wind box by means of a track and roller mechanism 18 whereby the spuds may be moved forward or backward with respect to the burner ports.

The hydrocarbon to be decomposed, i. e., hydrocarbon make, natural gas, for instance, is supplied to the system through the lines 19 and valved branch lines 20 to the manifolds 21 extending vertically along opposite sides of the furnace chamber, as more clearly shown in Figure 3 of the drawings.

A plurality of ports 22 extend through the respective side walls of the furnace chamber, the ports being uniformly spaced over the entire height of the chamber. Each port is provided with a hydrocarbon make injection tube 23 extending axially therethrough and terminating at a point substantially flush with the inner surface of the chamber wall and connected at their outer ends with a manifold 21. Interposed in the connections just noted are the unions 24, for facilitating removal and replacement of the tubes 23, and valves 25 for adjusting and regulating the amount of hydrocarbon make passed through the respective tubes.

As more clearly shown in Figures 4 and 5 of the drawings, the vertical dimension of the tubes 23 is increased at the inner end of the tubes to substantially the height of the port and the respective tubes are closed at their inner ends by end plates or spray heads 26 provided with perforations 27. As previously noted, the transverse dimensions of the tubes 23 for the greater portion of their length are substantially less than that of the ports so that an annular space is provided between the outer surface of the tube and the inner surface of the port for the greater portion of the distance through the furnace wall. The horizontal dimension of the inner end of the tube 23 is, with advantage, substantially that of the tube, or only slightly in excess thereof, so as to hold to a substantial minimum the volume of hydrocarbon make in heat exchange relation with the side walls of the furnace chamber and the spray head 26.

The space within the ports surrounding the respective hydrocarbon make injection tubes is sealed by means of a plug 28 so as to prevent egress of the hot furnace gases. These plugs 28 also assist in the centering of the tubes within the ports and prevent any sagging of the tubes which might throw the spray heads out of alignment with the inner walls of the furnace chamber. The plugs 28 may, with advantage, be of highly refractory heat insulating material adapted to retard transfer of heat from the walls of the furnace chamber to the hydrocarbon make injection tubes. The outer end of these plugs is, with advantage, tightly sealed by means of furnace cement, or the like, as shown at 29.

In operation, a combustible mixture of fuel gas and air is blasted into the upstream end of the furnace chamber through the ports 14 and is burned to form a hot turbulent mixture of blast flame gases of substantially uniform temperature, velocity, and composition throughout the transverse section of the chamber. The hydrocarbon make, advantageously preheated natural gas, is supplied through line 19, branch lines 20 and manifolds 21, as previously described, and is injected through the tubes 23 and spray headers 26 into the hot turbulent blast flame gases passing through the furnace chamber. As more clearly shown in Figures 4 and 5, the hydrocarbon make enters the chamber as a plurality of streams much smaller in transverse area than the transverse area of the tubes 23 and is substantially instantaneously, completely mixed with the blast flame gases and is decomposed by heat absorbed therefrom to form carbon black in suspension in the furnace gases. This suspension passes from the downstream end of the furnace chamber into a preliminary cooler 30 and, from thence, to conventional cooling and separating apparatus. Cooling of the suspension may be facilitated by water sprays 31.

Where natural gas is used as the hydrocarbon make, it is frequently desirable to enrich the natural gas by mixing a higher molecular weight hydrocarbon therewith. This is, with advantage, accomplished by adding the higher molecular weight hydrocarbon in controlled amounts to the preheated natural gas passing to the manifolds 21. For this purpose, the enriching oil may be introduced into line 19 through valve connection 32. Also, where desired, steam may be introduced into the hydrocarbon make through valve connection 33.

The spray heads 26 should be fabricated of a heat-resistant alloy adapted to withstand the high temperatures within the furnace chamber, usually of the order of 2300 to 2900° F. However, in operation, these spray heads are materially cooled by the hydrocarbon make passing therethrough. Instead of heat-resistant alloy, the spray heads and also the tubes 23 may be of ceramic material adapted to withstand such high furnace temperatures.

In the specific apparatus represented by the drawings, the inside diameter of the hydrocarbon make injection tubes is approximately ⅜ inch. However, larger or smaller tubes may be used where desired. The diameter and spacing of the openings 27 through the spray heads is likewise subject to considerable variation. Advantageously the diameter of these openings is within the range of 7/32 to ¼ inch, and the distance between centers of these openings is within the range of 5/16 inch to ½ inch. The thickness of the spray head may, likewise, be varied somewhat, but is, with advantage, within the range of ¼ inch to ½ inch. Where the thickness of the spray head is further increased, or where small orifices therethrough are used, uniform spray is more difficult to maintain due to the tendency of carbon deposits to form within the orifices.

Advantageously, the orifices are so directed through the spray heads that the extended center line of the outer orifices in one spray head intersects the extended center line of the closest orifice in the next adjacent spray head at approximately the center line of the furnace chamber, the optimum angle being dependent upon the spacing of the injection tubes. As previously noted, these tubes should be spaced over the entire height of the furnace chamber and the optimum spacing will depend somewhat upon the diameter of the ports 22 and the vertical dimension of the spray heads.

In most operations, ports of about 2 inches in diameter are highly satisfactory.

In apparatus of the type shown, it has been found particularly advantageous to restrict the width of the furnace chamber to not over about 18 inches. Particularly desirable results have been obtained with furnaces of about one foot wide and about 3 to 4 feet high. The present invention is especially applicable to furnace chamber approximating the dimensions just noted. However, its utility is not restricted to those particular applications.

Because of the insulating effect of the annular plug 28 and the annular air space within the port, excessive decomposition of the hydrocarbon passing through the tubes 23 is readily avoided and carbon deposition within those tubes and within the orifice 27 of the spray heads is minimized. However, when necessary to clean the respective injection tubes, they may be readily detached from the manifold by loosening the union 24 and the entire injection tube assembly withdrawn through the port and cleaned, and replaced with a minimum of difficulty.

As previously noted, the specific apparatus described and disclosed in the drawings is of rectangular transverse section. It will be understood, however, that the invention is also applicable to cylindrical furnaces.

The invention will be further described and the advantages thereof illustrated by the following specific examples. However, the invention is, of course, not restricted to these illustrative embodiments thereof.

Example I

In a particularly advantageous embodiment of the invention in apparatus of the type described comprising a cylindrical reaction chamber, the diameter of the chamber was 9 inches I. D., and the chamber was provided with four radially positioned hydrocarbon make injection tubes equidistant from the upstream end of the chamber and spaced apart 90°. These injection tubes were one-half inch I. D., and were closed at their outer ends by a T-shaped end plate, or spray head, substantially as shown in Figures 4 and 5 of the drawings. The end plate of each tube was provided with seven drilled holes in vertical alignment, each ⅛ inch in diameter.

In operation of this furnace, air for combustion was supplied at the rate of 8,040 cubic feet per hour and the ratio of air to fuel gas was 12.4:1, the fuel gas being natural gas of 960 B. t. u. value. A hydrocarbon make gas similar to the fuel gas was injected through the hydrocarbon make tubes at a rate such that the ratio of air to total hydrocarbon gas, i. e., fuel gas plus make gas was 4.6:1. In this operation, the carbon black product was found to have a color value of 160, a tinting strength of 118, and an oil absorption value of 8.4.

In a similar operation, in apparatus identical with that described except that the hydrocarbon make was injected through conventional, open ended one-half inch I. D. tubes under identical load conditions, the color value of the carbon black product was 137, its tinting strength was 104 and its oil absorption value was 10.3.

Example II

In a further particularly advantageous embodiment of the invention, the reaction chamber was rectangular in cross-section, 11 inches wide and 25 inches high and was provided with eight make gas injection tubes, each one-half inch in side diameter, four tubes being uniformly spaced vertically along the height of opposite side walls. The inner ends of these tubes were T-shaped, as previously described, and were closed by end plates, or spray heads, in which there were drilled six holes, each $7/_{32}$ inch in diameter, uniformly spaced vertically over the height of the respective end plates.

In operation of this apparatus, air for combustion was supplied through a blast burner substantially as shown in the drawings at the rate of 43,000 cubic feet per hour and natural gas of 960 B. t. u. value was supplied to the blast burners, as fuel gas, at a rate such that the ratio of combustion air to fuel gas was 12.5:1. Natural gas of the type used as fuel gas was injected into the chamber through the injection tubes described at a rate such that the ratio of air to total hydrocarbons, i. e., fuel gas plus make was 5:1. The color value of the carbon black produced was 153, its tinting strength was 114 and its oil absorption value was 8.3.

In a substantially identical operation, except that the hydrocarbon make was injected through conventional, open ended make gas injection tubes of ½ inch I. D. under identical load conditions, the color of the resultant carbon black was 115, its tinting strength was 93 and its oil absorption value was 8.4.

From the foregoing examples, it appears that my present invention is particularly useful where a carbon black product of increased color value and tinting strength and relative low oil absorption is desired.

I claim:

1. Apparatus for producing carbon black comprising an elongated, heat-insulated reaction chamber, a blast burner positioned in one end of the chamber, provided with a multiplicity of burner ports uniformly spaced over the entire transverse area of the chamber and adapted to the blasting of a hot turbulent stream of flame gases through the chamber, and hydrocarbon make injection means positioned at a zone intermediate the ends of the chamber and comprising ports extending perpendicularly through opposite side walls of the chamber and tubes extending coaxially through the respective ports and terminating about flush with the inner side wall of the chamber, the dimension of the inner end of the respective tubes being substantially increased in a direction perpendicular to the longitudinal axis of the chamber, and the enlarged end being closed by a plate, a multiplicity of make injection ports extending through said plate, said ports being of a transverse area less than that of said tubes and being spaced apart with their respective centers lying in a plane perpendicular to the longitudinal axis of the chamber, the plate being otherwise imperforate.

2. The apparatus of claim 1 in which the diameter of the ports extending through the plate is within the range of $7/_{32}$ inch to ¼ inch.

3. The apparatus of claim 2 in which said ports are vertically spaced apart a distance within the range of $5/_{16}$ inch to ½ inch between centers.

4. The apparatus of claim 3 in which the thickness of the plate is within the range of ¼ inch to ½ inch.

5. The apparatus of claim 1 in which the extended center line of an end port in one plate intersects the extended center line of the closest port in the next adjacent plate at about the center line of the chamber.

6. Apparatus for producing carbon black comprising an elongated heat-insulated reaction chamber of rectangular cross-section, a blast burner positioned in one end of the chamber, provided with a multiplicity of burner ports uniformly spaced over the entire transverse area of the chamber and adapted to the blasting of a hot, turbulent stream of flame gases through the chamber, and hydrocarbon make injection means positioned in a zone intermediate the ends of the chamber and comprising ports extending perpendicularly through opposite side walls of the chamber and uniformly spaced over the entire height thereof, tubes extending coaxially through the respective ports and terminating about flush with the inner side walls of the chamber, the dimension of the inner end of the respective tubes being substantially increased in a direction perpendicular to the longitudinal axis of the chamber, and the enlarged end being closed by a plate, a multiplicity of make injection ports extending through said plate, said ports being of a transverse area less than that of said tubes and being spaced apart with their respective centers lying in a plane perpendicular to the longitudinal axis of the chamber, the plate being otherwise imperforate.

References Cited in the file of this patent

UNITED STATES PATENTS

| Number | Name | Date |
|---|---|---|
| 1,773,002 | Hunt | Aug. 12, 1930 |
| 2,025,331 | Bullum | Dec. 24, 1935 |
| 2,183,313 | Goddard | Dec. 12, 1939 |
| 2,249,489 | Noack | July 15, 1941 |
| 2,375,795 | Krejci | May 15, 1945 |
| 2,440,423 | Wiegand et al. | Apr. 27, 1948 |
| 2,440,424 | Wiegand et al. | Apr. 27, 1948 |
| 2,529,873 | Heller | Nov. 14, 1950 |
| 2,597,232 | Eckholm et al. | May 20, 1952 |
| 2,597,233 | Eckholm et al. | May 20, 1952 |